Sept. 14, 1965  L. C. TALLEY  3,205,705
GAS TURBINE JET AND ROCKET ENGINE GROUND TEST EXHAUST SYSTEM
Filed Dec. 8, 1961
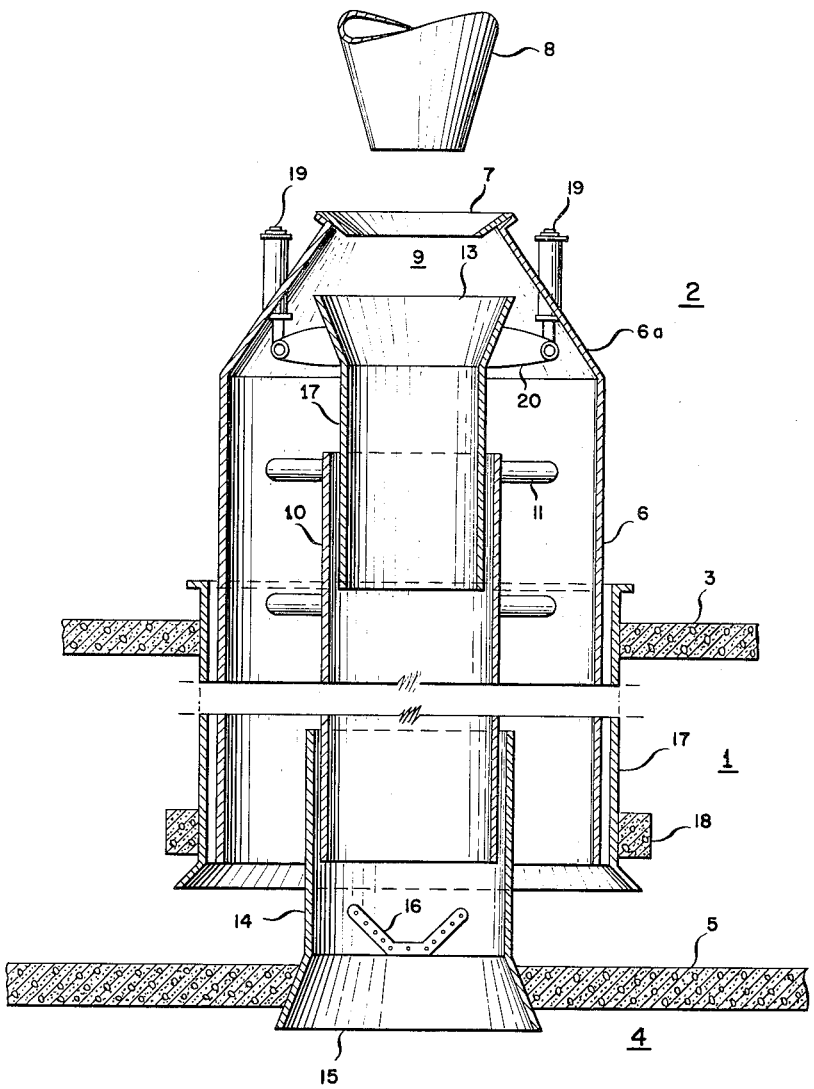
INVENTOR
LAWRENCE C. TALLEY 3,205,705
GAS TURBINE JET AND ROCKET ENGINE
GROUND TEST EXHAUST SYSTEM
Lawrence Covington Talley, 1300 Elk Ave., Norfolk, Va.
Filed Dec. 8, 1961, Ser. No. 157,925
1 Claim. (Cl. 73—116)

The present invention is directed to apparatus for maintaining static air environment in the area of air breathing and rocket engines while undergoing ground testing. More particularly the invention concerns the isolation of causes for pressure loss resulting in erroneous performance calibration when engine tests are conducted in other than static air conditions.

Heretofore, operators of jet engines have been unable to eliminate the problem of faulty calibration at the time of production testing and after repair of engines to reestablish performance data. Faulty calibration is obtained when exhausted propulsion gases are allowed to accelerate the air mass ahead of the engine face and/or sweep by the external areas of the engine imparting rearward force to any exposed members supported by the floating thrust recording system. These forces become more severe toward the rear of the engine as velocity increases due to movement imparted to the surrounding air by action of the propulsion gases upon the reservoir of air surrounding the engine. Unless an air breathing engine can inflow air at zero velocity and exhaust the propulsion gases into like conditions, a distance equal to no less than one nozzle diameter aft the engine exhaust nozzle, erroneous calibration will result. Inlet momentum drag is the expression for the adverse effect of air in addition to engine air requirement, this additional air upsets normal engine pressure ratio. Buoyancy is the term applied to the secondary flow of air which exerts counter force rearward. Numerous methods have been employed to remove the adverse effects of mass air movement on thrust specific fuel consumption and thrust versus engine pressure ratio, in addition to the parasitic effect of buoyancy. Some improvement results when incoming total air is admitted fore and aft overhead of the engine test chamber. It is the variable nature of ambient air condition prevailing which causes established correction equations for drag and thrust loss to differ from those required to indicate true engine performance.

Damaging sound frequency is ever present where jet engines are in operation. Sound attenuation equipment is costly to install and maintain because of exposure to the high temperatures, velocities and the corrosive effect of exhausted propulsion gases. The most satisfactory way to reduce elevated temperature and velocity of the exhaust stratum prior to exposure to elements of the muffler stack is by isolating and mixing of air with the exhaust stratum maintaining sufficient velocity in transition to a final reduction at entry into the muffler stack coupled to the apparatus. This method of handling of propulsion gases serves to remove elevated temperature by introduction of incoming cooling air, and causing the most audible low turbulence frequency to occur within the muffler stack.

An object of this invention is to provide apparatus for receiving exhausted propulsion gases near the engine and by controlling pressure reduction by regulation of air entry into the apparatus, incoming cooling air will be drawn into and surround the exhaust stratum in transition to the muffler stack. The incoming cooling air is isolated from the engine area thus eliminating the causes of thrust loss due to buoyancy and inlet momentum drag.

The object stated above as well as other objects of this invention will be apparent from the following description of the accompanying drawing in which:

The figure schematically shows a top sectional view of a typical ground test exhaust apparatus for reaction engines.

The installation includes an intake chamber 1 which receives inflowing air; said chamber 1 is a space separated from the reaction engine test chamber 2 by a baffle wall 3 and is separated from a rearward space; which is a muffler stack, 4 by a second baffle wall 5. Both baffles are illustrated as concrete walls. The outflowing air from intake chamber 1 moves forward through the open rearward end of an adjustable outer duct 6 extending through the first baffle wall 3 into the engine test chamber 2. The forward end of outer duct 6 is inwardly tapered 6a to an opening at the center which is provided with an exhaust inlet adapter 7 the inside diameter of which is of sufficient size to permit drag-free entry of exhausted propulsion gases; from the reaction engine exhaust nozzle, 8 flowing into the mixing chamber 9. The inner duct 10 is fixed to the outer duct 6 by means of stream-line shaped supports 11 and is spaced in relation to the outer duct 6 to form a passageway for cooling air in-flowing from chamber 1. The ejector tube 12 fits within the forward end of inner duct 10 and is telescopically adjustable to position the periphery of the flared forward end 13 relative to the inside surface of the tapered forward end of outer duct 6a to regulate; by valving action, the air inflowing to mixing chamber 9. The rearward section of inner duct 14 is flared 15 where the final transition of propulsion gases are expelled to the muffler stack 4. A conventional water spray 16 is located at the rearward end of duct 14 where the flared section 15 extends rearward through baffle 5 into muffler stack 4. The outer duct 6 is supported by a tubular housing 17 which in turn is supported at the rear by a concrete pillar 18. The forward end of said support housing 17 passes through baffle 3; each end is provided with a tapered flare to present a beveled edge to contact with adjustable outer duct 6.

The above mentioned ejector tube 12 is positioned laterally by means of double-acting hydraulic cylinders 19 affixed to the tapered front portion of outer duct 6a the piston rods of said hydraulic cylinders extend rearward to connecting links 20 affixed to the flared front end 13 of ejector tube 12. The fore and aft movement of the adjustable ejector tube 12 is by means of a two-way hydraulic valve installed at the test operator's control panel, utilizing facility pumped hydraulic fluid to the cylinders 19.

Features of this invention are its versatility in that each size can be engineered to fit the same range of engine sizes for which the thrust frame and test instruments are constructed. In addition, it will be noted that no part of the apparatus is exposed directly to the blast of the exhaust. Another feature is that being a self contained unit, it can be used in cooperation with most existing types of sound attenuation devices which may be installed within the muffler stack 4 and the intake chamber 1.

Construction materials are mill stock steel plate; except for the exhaust adapter 7 which will be of high grade steel to with stand high temperatures and sonic shock forces. The apparatus will not require additional modification to test facilities for the reason that all modern test houses have exhaust cooling water spray rings 16, hydraulic pressure systems for door and hoist operation which also will be utilized in conjunction with this apparatus when operated to maintain desired test cell pressure readings.

I claim:

A reaction engine ground test apparatus which comprises:

(a) first and second spaced apart baffles, the space between the baffles defining an intake chamber, and the space to the rear of the second baffle being a muffler stack;

(b) an adjustable outer duct, open at the rear and extending through the first baffle into the intake chamber, inwardly tapered at the front end and provided at said tapered end with an exhaust adapter positioned no less than one nozzle diameter away from the reaction engine undergoing test;

(c) an inner duct fixed coaxially within the outer duct and extending through both first and second baffles into the muffler stack, said inner duct being spaced from the outer duct to form a passageway for incoming cooling air;

(d) an ejector tube adjustably telescoped within the inner duct and provided with an outwardly flared opening at its forward end;

said flared end cooperating with the tapered portion of the outer duct to form a valve to regulate the flow of the incoming cooling air;

said inner duct and said ejector tube having a diameter at least fifty percent larger than the largest exhaust nozzle of the engine to be tested; and (e) actuating means for laterally positioning the ejector tube within the inner duct to control the amount of incoming cooling air admitted into the ejector tube.

References Cited by the Examiner

UNITED STATES PATENTS

| | | | |
|---|---|---|---|
| 2,519,531 | 8/50 | Worn. | |
| 2,615,331 | 10/52 | Lundgren | 73—116 |
| 2,661,072 | 12/53 | Lemmerman | 181—43 |
| 2,685,936 | 8/54 | Brenneman et al. | 181—43 X |
| 2,706,013 | 4/55 | Wigle | 181—43 |
| 2,763,155 | 9/56 | Beams et al. | 73—116 |
| 2,810,449 | 10/57 | Coleman | 181—43 |
| 2,975,632 | 3/61 | Ganahl | 73—116 |
| 3,015,231 | 1/62 | Ganahl | 73—116 |
| 3,064,471 | 11/62 | Pierce | 73—116 |

OTHER REFERENCES

Book: Jet Propulsion Engines, 1959, Princeton University Press, Editor, O. E. Lancaster, page 196.

RICHARD C. QUEISSER, Primary Examiner.